United States Patent [19]

Ray et al.

[11] Patent Number: 5,473,327
[45] Date of Patent: Dec. 5, 1995

[54] METHOD AND APPARATUS FOR DATA ENCODING WITH RESERVED VALUES

[75] Inventors: Lawrence A. Ray; Richard N. Ellson, both of Rochester, N.Y.

[73] Assignee: Eastman Kodak Company, Rochester, N.Y.

[21] Appl. No.: 144,753

[22] Filed: Oct. 29, 1993

[51] Int. Cl.⁶ ..................................................... H03M 5/14
[52] U.S. Cl. ............................................................. 341/55
[58] Field of Search .................................................. 341/55

[56] References Cited

U.S. PATENT DOCUMENTS 4,752,765  6/1988  Larson ........................................ 341/55

Primary Examiner—Howard L. Williams
Attorney, Agent, or Firm—Edward Dugas

[57] ABSTRACT

In a string of characters on a storage medium in which a normally reserved character can appear in an inappropriate position, the field of characters is examined for a character which is not used in the field. The inappropriate reserved character is replaced by the permissible character. A field in the character string is reserved to permit the permissible character to be translated into the reserved character after the decoding of the character string.

11 Claims, 7 Drawing Sheets

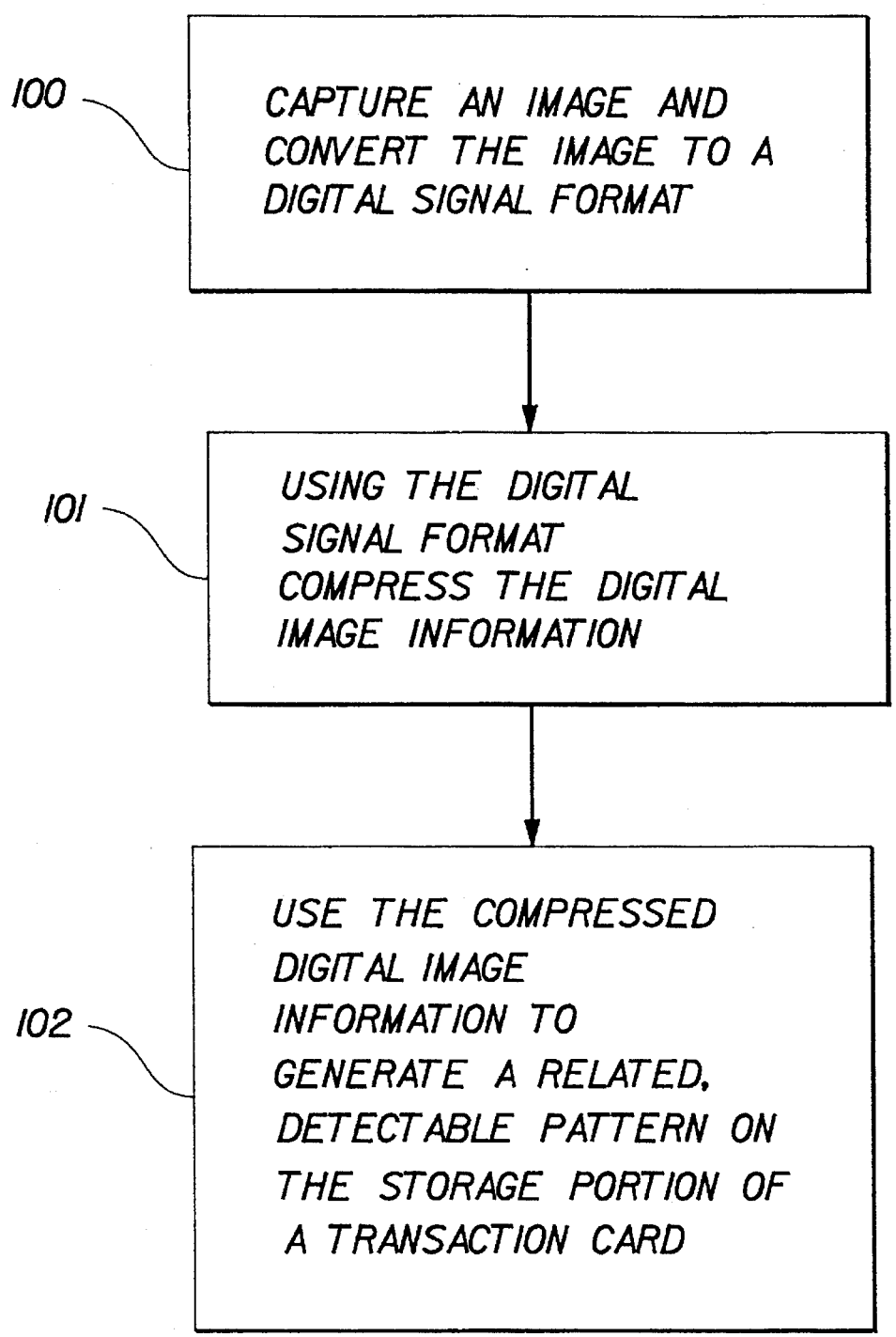
Fig.IB

METHOD AND APPARATUS FOR DATA ENCODING WITH RESERVED VALUES

FIELD OF INVENTION

This invention relates generally to the field of transaction card validation and, in particular, relates to encoding information within the constraints of ISO 7811/2 standards for (financial) transaction cards. The ISO 7811/2 standards reserve certain characters which would otherwise be available for encoding information on the transaction card. The reserved values or characters must be replaced on the transaction card in such a manner that the decoding apparatus can reconstruct the correct character or value without unnecessary processing.

BACKGROUND OF THE INVENTION

Transaction cards are a convenient and accepted means of accessing services and financial resources. In order for these cards to be accepted internationally the data format of these cards has been agreed upon. While these standards offer many advantages, the standards pose obstacles for applications not initially intended or considered by the authors of the standards. The present invention describes a method to maintain the data structure described by ISO 7811/2 while encoding information which, in its usual form, would not comply to the standard.

The application of primary importance is the ability to store information on the magnetic stripe of a transaction card sufficient to reconstruct a recognizable image. Credit card fraud is a significant problem in the credit industry, and various means and methods have been attempted to reduce the fraudulent use of credit cards. One of these methods encodes the digital image of the cardholder ("Method and Apparatus for Credit Card Verification"; U.S. patent application Ser. No. 08/019,538; invented by Lawrence A. Ray and Richard N. Ellson; and filed on Feb. 18, 1993 now U.S. Pat. No. 5,321,751 issued on Jun. 14, 1994.). Encoding this image requires data compression of an original image. The compression algorithm is described in U.S. patent application Ser. No. 08/145,051 entitled "Method and Apparatus for Image Compression, Storage and Retrieval on Magnetic Transaction Cards"; invented by Lawrence A. Ray, Richard N. Ellson, and Bhavan R. Gandhi; filed on even date herewith; and assigned to the assignee of the present Application). The encoded data from this method generates a string of binary digits, and this digit string must be written onto a magnetic stripe in a manner compatible with ISO standards and in particular standard ISO 7811/2.

A need has therefore been felt for apparatus and a procedure by which the raw binary bit string can be converted to a format which is in compliance with international standards which cover magnetic financial transaction cards. This compliance includes the transmission of information which would otherwise be encoded by a reserved character or value.

SUMMARY OF THE INVENTION

The present invention is directed to overcoming one or more of the problems set forth above. Briefly summarized, according to one aspect of the present invention, a method is provided to encode digital data when the encoding symbol set does not permit all combinations of characters. The reserved characters which are inappropriately positioned in the raw data stream are identified. The raw data stream is then examined to identify unreserved characters which are not present in the raw data stream. Then inappropriately positioned reserved characters are replaced by the unused characters and a specified portion of the raw data stream is used to provide the original character.

The present invention advantageously permits the automatic replacement of an inappropriately placed reserved character on the transaction card with an available character. The original character is automatically reconstructed when the transaction card is read. The information is not compromised by the procedure.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
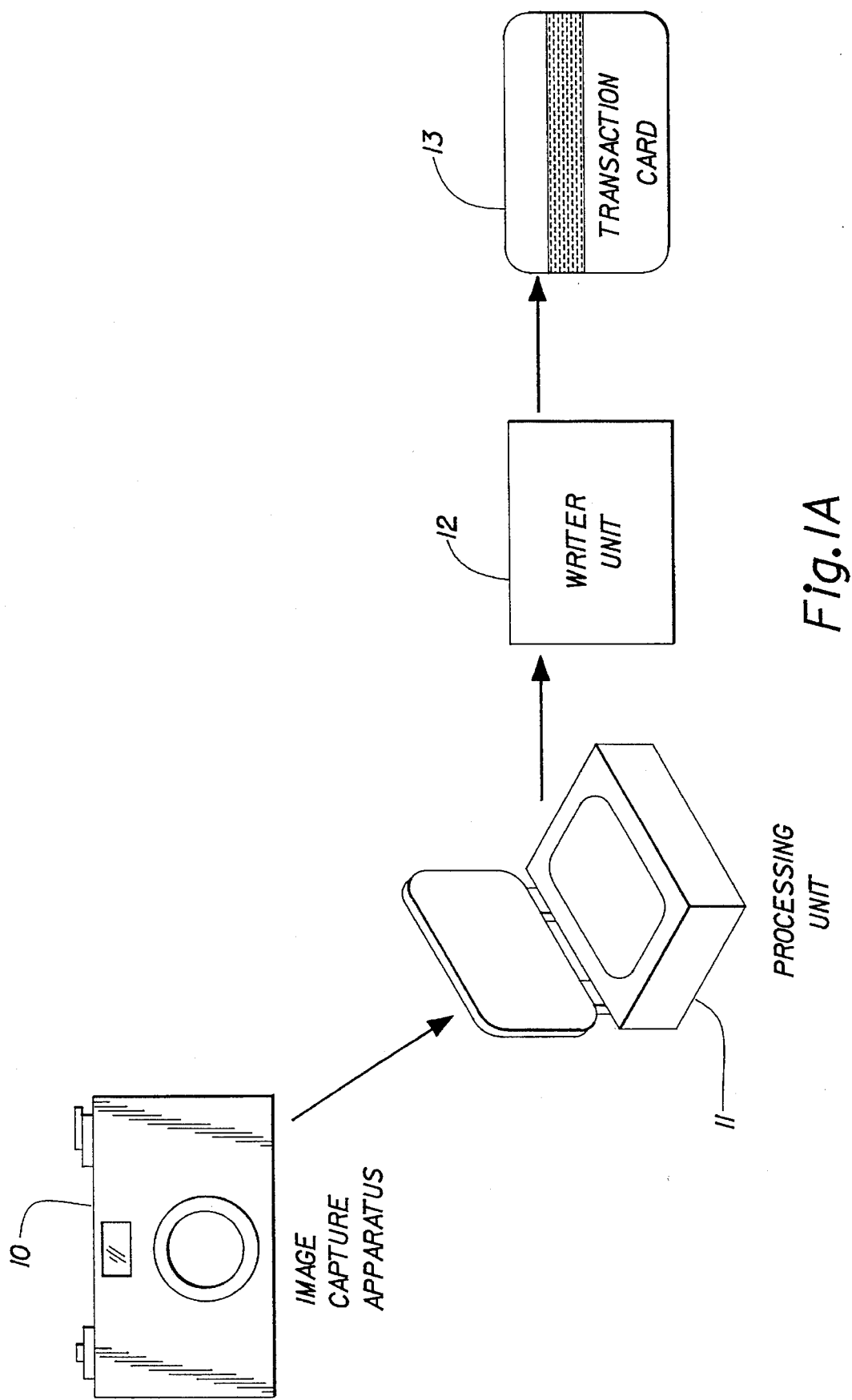
FIG. 1A is a block diagram of the apparatus for applying encoded image on a transaction card, while FIG. 1B indicates the steps in applying an encoded image on a transaction card.

Referring to FIG. 1A, the apparatus for encoding image information on a magnetic stripe of a transaction card 13 is illustrated. An image is captured by an image capture apparatus 10 in a form capable of being stored and transformed into digital logic signals. The image can be captured, for example, on photographic film or can be stored as a set of analog electrical signals. In the example of a photographic film, the image capture apparatus 10 includes a film reader to provide a set of analog signals. The analog signals can be applied to an analog-to-digital converter. The digital signals from the image capture apparatus 10 are applied to a processing unit 11 wherein the image information is compressed. The resulting digital signals are applied to a writer 12 wherein the digital signals are encoded as electrical signals whereby the writer 12 generates a storage pattern on a storage material on the transaction card 13.

Referring to FIG. 1B, the process for storing encoded image information on a transaction card is shown. In step 100, an image is captured and is transformed into an ordered set of digital signals. The digital signals are then compressed in step 101. In step 102, the compressed digital signals are used to generate a recognizable pattern on a storage material associated with the transaction card.

Figure 2A:
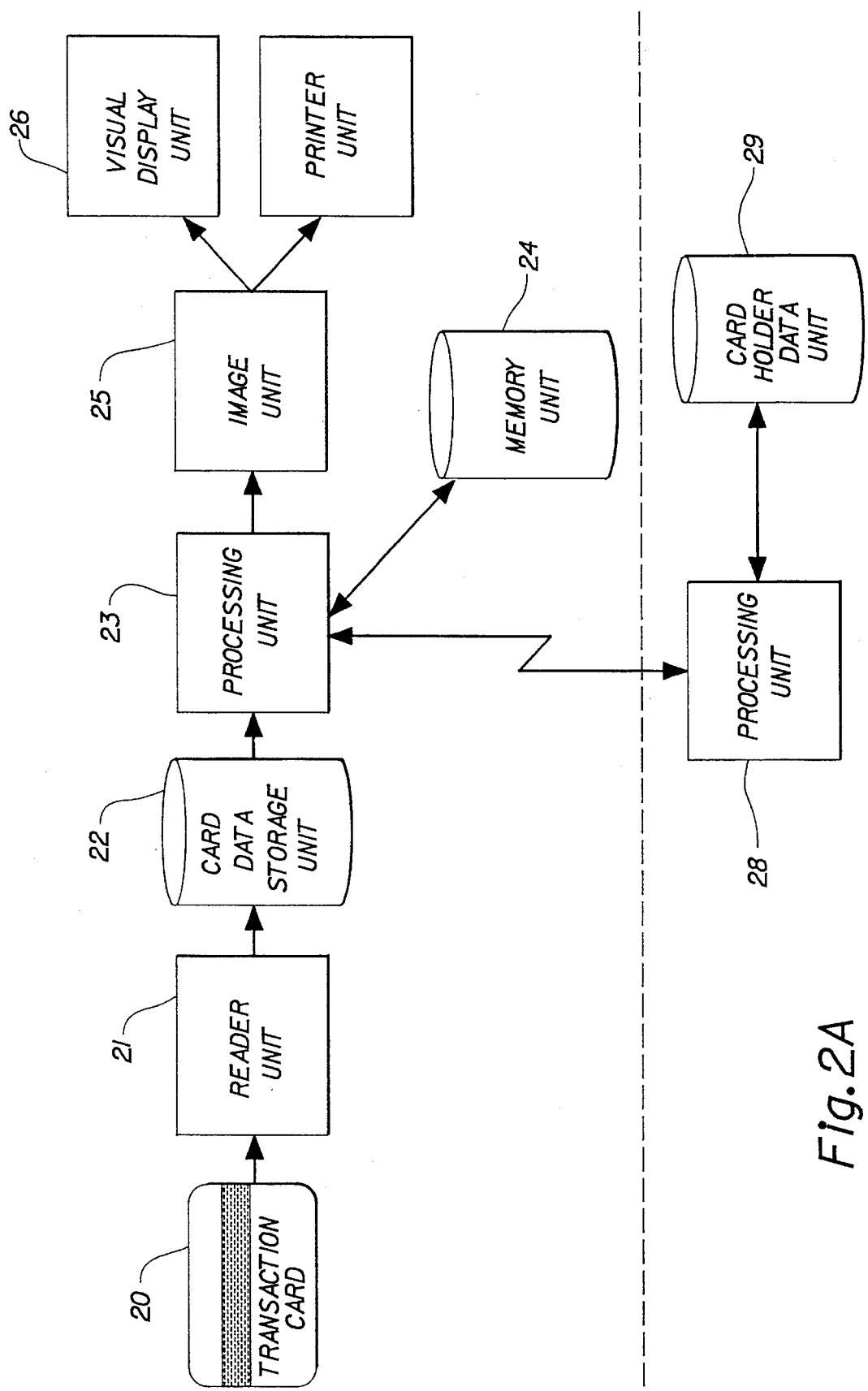
FIG. 2A is a block diagram of the apparatus for retrieving an encoded image from a transaction card, while FIG. 2B describes the steps in retrieving an encoded image from a transaction card.

Referring to FIG. 2A, the apparatus for retrieving encoded information from the storage portion of a transaction card 20 is shown. The reader 21 recognized the patterns in the storage area of the transaction card 20 and converts the patterns to a set of digital signals. The digital signals retrieved from the transaction card are stored in card data storage unit 22. The data from the card data storage unit 22 is applied to the processing unit 23. In the processing unit 23, digital signals are restored (i.e., decompressed) using data, for example, from codebook memory unit 24. The digital signals of the restored image are applied to the image unit 25. The image unit 25 converts the signals comprising the restored image into signals appropriate for driving a visual display unit 26 or a printer unit 27. In certain circumstances, the processor unit 23 can transfer data, (e.g., the compressed or encrypted image digital signals to a remote processing unit 28. In the remote processing unit 28, the images stored on the transaction card 20 can be compared with information stored in card data storage 29. This comparison can take place when the transaction at a remote location has a problem associated therewith.

Figure 2B:
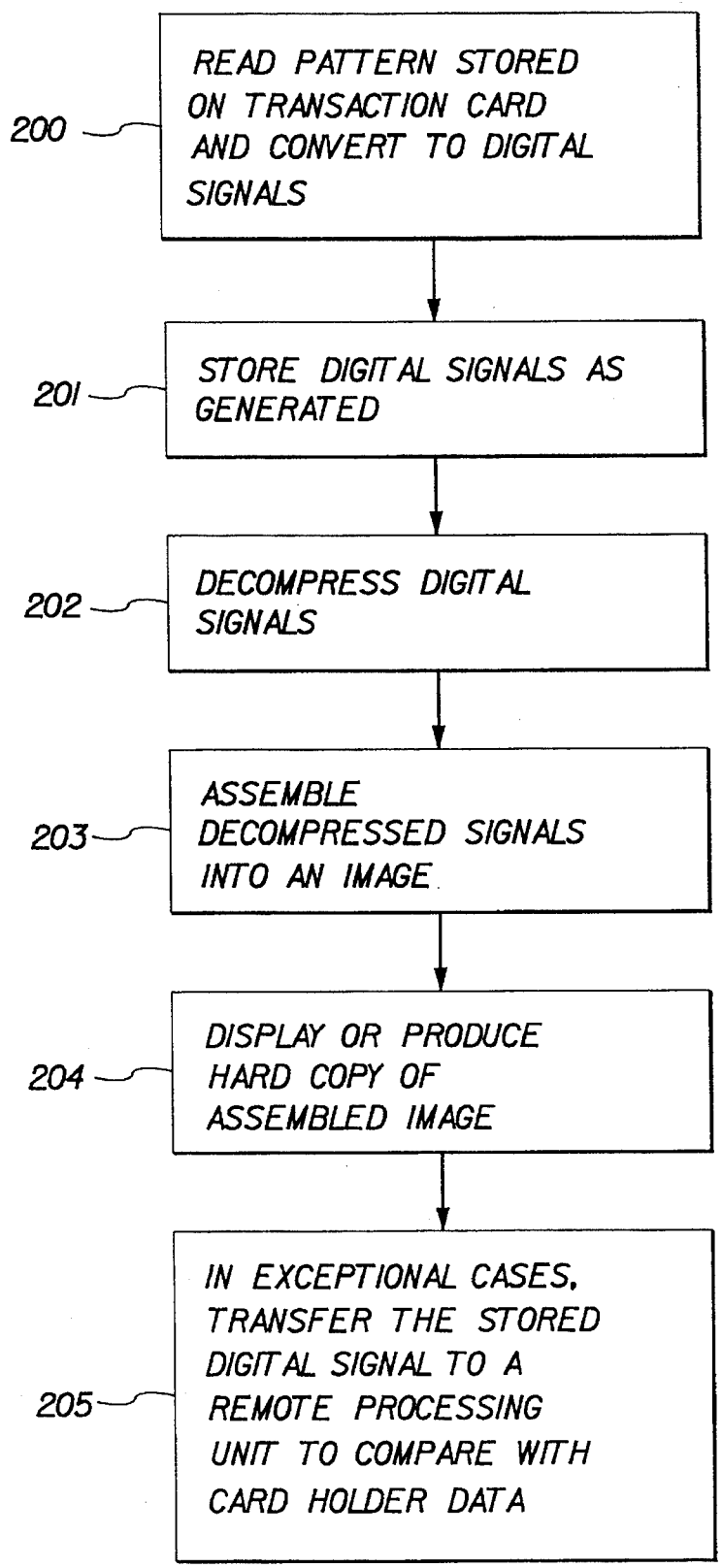

Referring to FIG. 2B, the process by which an image is retrieved from a transaction card is shown. In step 200, a reader interacts with the transaction card and translates the pattern stored in the storage unit into digital signals. The digital signals are stored, in step 201, as the signals are identified by the reader. In step 202, the digital signals are restored, i.e., decompressed. The decompressed digital signals are assembled into a "restored" image in step 203. In step 204, the signals representing a restored image are applied to the driver circuits of an image display unit or a printer and the restored image is provided for visual examination or comparison. In step 205, the image stored on the transaction card can be transferred to a remote location for comparison, verification, etc. with an archival copy of the image stored on the transaction card.

Figure 3:
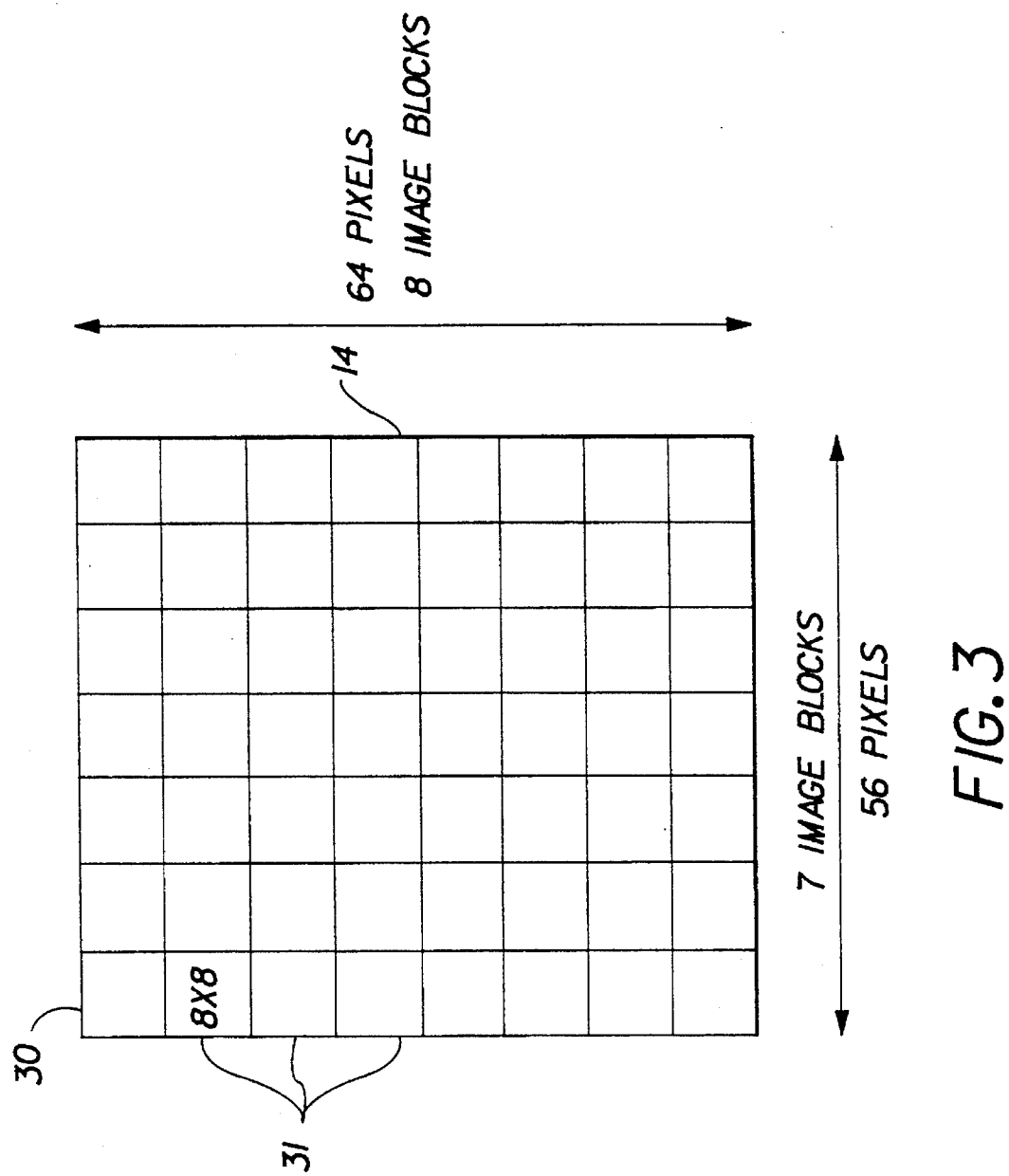
FIG. 3 illustrates the formation of pixel image blocks in a pixelized image.

Referring to FIG. 3, an image is converted into a matrix of pixels. In the example cited, the image matrix 30 is 64 pixels by 56 pixels. The pixel matrix 30 is divided into image blocks 31 of 8 pixels by 8 pixels.

Figure 4:
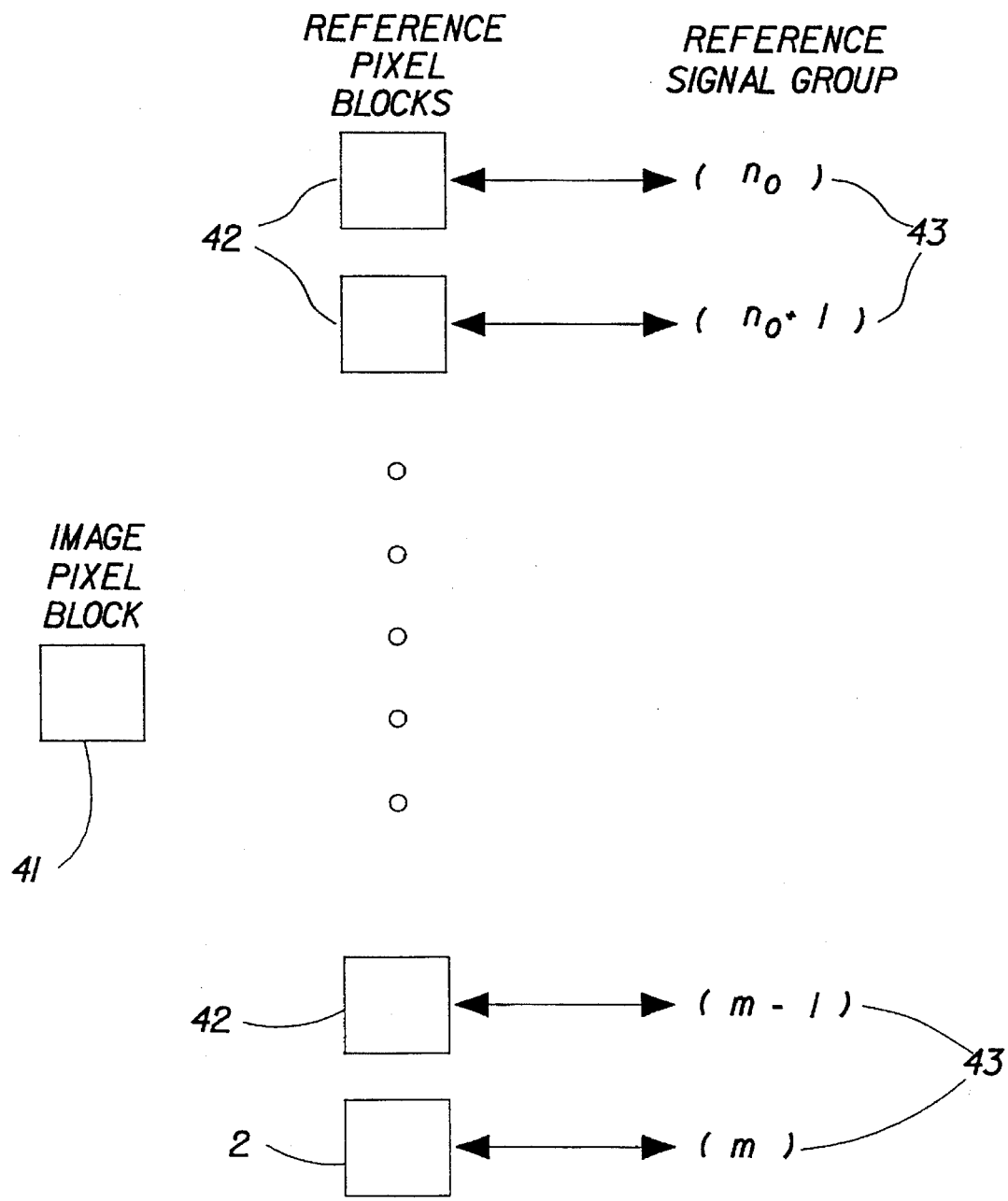
FIG. 4 illustrates how the reference signal groups are derived from pixel image blocks.

Referring to FIG. 4, the image pixel block 41 has associated therewith a plurality of reference pixel blocks 42. Each reference pixel block has a signal group associated therewith. The reference signal blocks do not have all possible pixel combinations identified therein. Therefore, based on a predetermined criterion, the reference pixel block most closely associated with the image pixel block is selected and the identifying signal group 43 is now used to identify the image at the location of the image pixel block. The set of signal groups resulting from the comparison of the image pixel block and the reference pixel block is a compressed representation of the image. This representation can be stored on the transaction card. In order to reconstruct the image, at the station reading the transaction card, the set of signal groups is identified and the associated reference pixel group placed in the position of the image pixel block generating the signal group.

The information capacity of a magnetic stripe on a credit card or identification card is usually quite small. International standard, ISO-7811/2, sets 210 bits/inch as a magnetic recording density on a 2.6 inch portion of the magnetic stripe. This yields a recording capacity of 553 bits, and of these bits, 97 are reserved for parity checks and control characters. To transform a normal continuous-tone image into the 456 bit space, the multi-bit/pixel image is compressed to reduce the data. The result is an image from which identification of the cardholder can be ascertained reliably.

Figure 5:
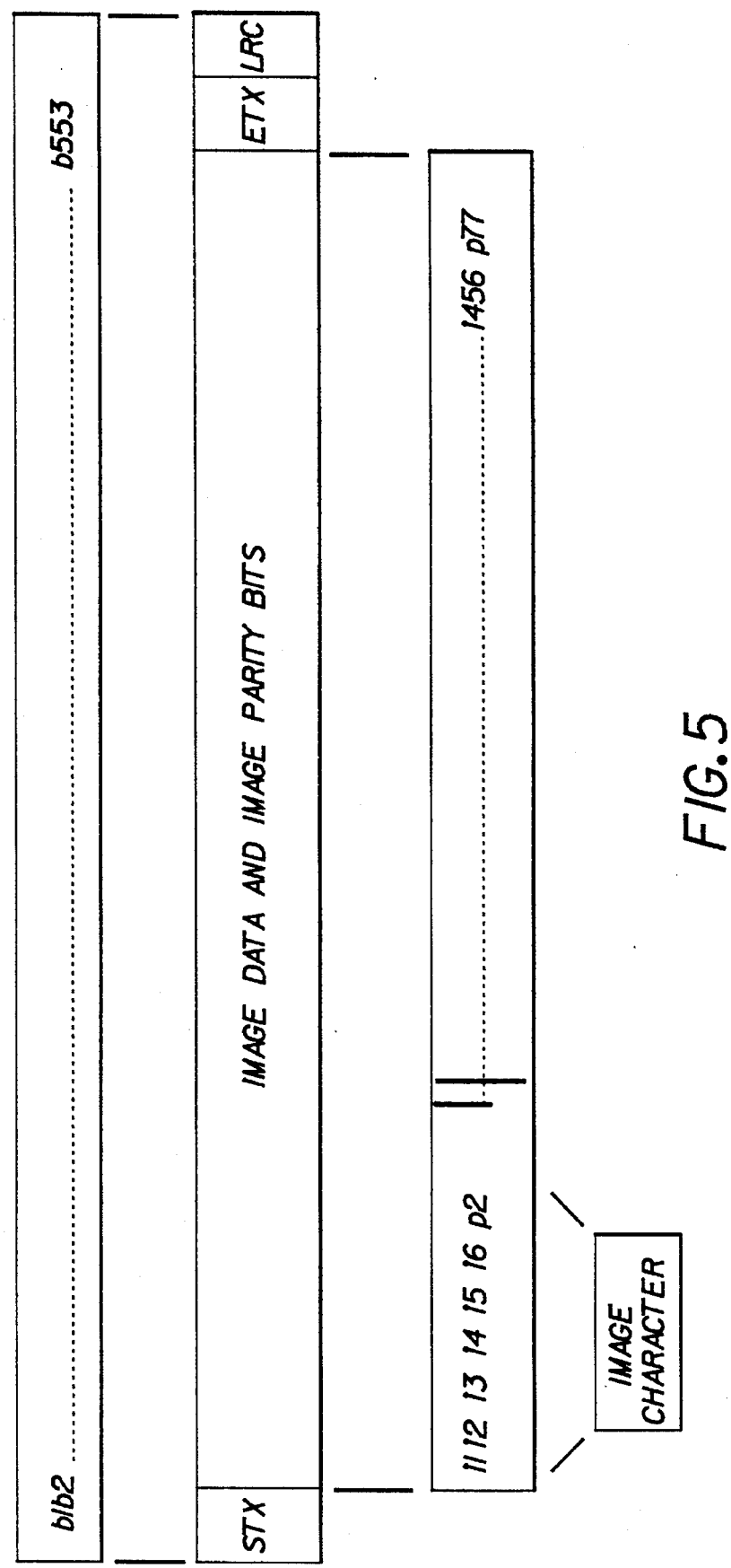
FIG. 5 illustrates the ISO Standard data format for magnetic stripe on a credit card

Referring to FIG. 5, the data format structure of the transaction card is shown. ISO 7811 standards for magnetic encoding on credit cards permits up to 79 "characters" where each character is comprised of a seven-bit string. The data format has 553 raw data bits, the $i^{th}$ bit in the resulting string will be denoted by b(i). The first character or first 7 bits is a special character known as a start sentinel (STX) which denotes the start of the string of data bits. Bit b(8) through bit b(539) are known as the image and image parity bits. The image bits are denoted as $i_j$, j=1, ..., 456, and the parity bits are denoted by $P_k$, k=2, ..., 77. The image and parity bits are interleaved such that after every sixth image bit there is a parity bit. The seventh bit is determined by the other six bits according to the relationship:

Odd Parity Equation (1)

$$p_{k+1} = \left( 1 + \sum_{j=6k}^{5+6k} i_j \right) \mod 2$$

There are two other special control characters, the end sentinel character (ETX) and the longitudinal redundancy check (LRC). Other characters have six data bits and the seventh bit is an odd-parity bit.

As a result the bit stream resulting from the image compression must be parsed with odd-parity bits inserted after every sixth bit in order that the format comply with the ISO standard. The first six bits are determined for the longitudinal redundancy code by:

$$LRC_i = \left( \sum_{k=1}^{76} b_{(i+6k)} \right) \mod 2 \quad (2)$$

The seventh bit of the LRC, LRC7, is determined by the equation:

$$LRC_7 = \left( 1 + \sum_{i=1}^{6} LRC_i \right) \mod 2 \quad (3)$$

In some magnetic readers there is an automatic conversion of two input characters being mapped to a single output character. As a result there are three six-bit strings which cannot be included as any of the data values encoded on the magnetic stripe. These characters are encoded as 7, 31 and 62, and referred to as A, B and C.

The information resulting from the image compression as described in the U.S. Patent Application entitled "Method and Apparatus for Image Compression, Storage and Retrieval on Magnetic Transaction Cards", cited above, has a variable number of bits per image block. The result of the compression is a binary string where codevalues are concatenated. The length of any individual codevalue is not necessarily a multiple of six. In order to prepare the string for encoding onto the magnetic stripe the string is partitioned into six-bit packets. The boundary of the six-bit packets and the codevalue packets are not aligned. This prevents the design of codevalues to avoid the reserved data values.

The maximum number of characters possible with a six-bit field is 64. This character set will be referred to as a font. As described, the actual values available are a subset of this character font, which will referred to as the effective font. The standard ISO format permits only 76 data characters of the 79 to be chosen without constraints. For the application of encoding a digital image onto the magnetic stripe a total of 442 bits, or 74 characters are needed.

The likelihood of the 74 characters using 62 or more unique characters is less than $10^{-7}$ which is determined using standard probabilistic methods, i.e., Poisson distributions (see William Feller, An Introduction to Probability Theory and Its Applications, Vol. 1., John Wiley & Sons, New York, 1971). As a result, it is most probable that there are at least three characters which are not used in the encoding of a compressed digital image. This is based on the assumption of a uniform distribution which is a worst case scenario. In practice, there are correlations within the data that make the probability non-uniform, and reduce the likelihood of less than three unused characters to be much less than $10^{-7}$. However, the particular characters which are not in use cannot be predicted in advance, only that three or more characters will not be used.

In the unlikely event that an insufficient number of unused characters exist, then some application, such as an alternative compression of image data, permits a means to recover. If the data compression method is vector quantization, then by progressively selecting codevalues which are the second best choice in mean-squared-error sense, a large number of alternative compression strings can be determined. The likelihood that all of these are encoded with all but three font characters is practically zero.

The 74 characters used in the encoded string are scanned to determine which of the 64 font characters have not been used. The lowest numbered unused font characters, excluding members of the reserved set will be referred to as X, the next unused font character will be Y and the next unused font character after Y is Z. The encoded string will be modified in such a manner that any character encoded with A will be replaced with X, any character encoded with B will be replaced with Y and any character encoded as C will be replaced with Z. The final 14 bits will be used to encode the replacement values. Five bits will be used to encode the value of X, the following five bits will be used to encode the difference between X and Y, and the final 4 bits to encode the difference between Z and Y.

Once the card has been encoded, the decoding of the string is a rather simple matter. Simply extract the fourteen bits used to encode X, Y and Z and reconstruct those values. Then, scan through the remaining bits and replace any occurrence of an X with A, any occurrence of Y with B, and any occurrence of Z with C. This will recover the initial bit string of the encoded digital string.

It will be now appreciated that there has been presented a technique for replacing characters in the raw data stream which are reserved for special interpretation. The technique does not require significant processing. In particular, the decoding operation can be executed with each transaction and is rapid and easy to implement. The procedure enables the recording of random data on a magnetic stripe while complying with the ISO 7811/2 standards Without providing an alternative processing procedure when a inappropriately placed reserved character is identified. The procedure furthermore adapts to the raw data stream and does not restrict the data to be encoded.

As will be clear to those skilled art, techniques other than vector quantization can be used to compress and decompress the image data. For example, differential pulse code modulation can be used in the compression/decompression procedures.

While the invention has been described with reference to a magnetic stripe, it is apparent that the invention is easily adapted to other information storage media, such as optical storage media, where relatively limited capacity in association with characters which are reserved, require special processing of the raw data stream.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Parts List
10 Image capture apparatus
11 Processing unit
12 Writer unit
13 Transaction card
20 Transaction card
21 Reader unit
22 Card data storage unit
23 Processor unit
24 Image unit
25 Image unit
26 Visual display unit
27 Printer unit
28 Processing unit
29 Card holder storage unit

What is claimed is:

1. A method for replacing a reserved character in a character string, with a permitted character, said method comprising the steps of:

identifying a reserved character in said character string;

identifying a permitted unused character which is not present in said character string; and replacing every instance of said reserved character with said permitted unused character.

2. The method of claim 1 further comprising the steps of:

identifying all permitted characters which are not present in said character string;

identifying a second reserved character in an inappropriate position in said character string;

replacing each second reserved character with a corresponding permitted and non-present character; and inserting a replacement signal segment in a predetermined location, said replacement signal segment being representative of the correlation between each permitted and non-present character and the replaced corresponding reserved character.

3. The invention as set forth in claim 1 wherein said method further includes inserting a first replacement signal segment in a predetermined location of the character string, said first replacement signal segment being representative of the relationship between said first reserved character and said permitted unused character.

4. The invention as set forth in claim 3 and further including the step of decoding the character string by reading said first replacement signal segment and substituting said first reserved character for each occurrence of said permitted unused character as determined by said first replacement signal segment.

5. The invention as set forth in claim 1 wherein the permitted unused characters are sequenced in accordance with a predetermined prioritization schedule, and said replacing step is accomplished in accordance with said prioritization schedule.

6. The invention as set forth in claim 5 wherein said prioritization schedule is based upon the binary value of the permitted unused characters.

7. A method of decoding an encoded character string in which at least one reserved character has been replaced by a permitted character, said permitted character being a character which is not present in said character string before the character string was encoded, said method comprising the steps of:

using a replacement signal segment from a predetermined portion of said encoded character string to identify each permitted character which has replaced a reserved character; and replacing said permitted character with said reserved character in accordance with said replacement signal segment.

8. A transaction card comprising:

a storage material having an identifiable pattern stored thereon, said pattern identifying a sequence of characters; wherein said storage pattern includes a replacement signal segment identifying a replacement character in said sequence of characters which replaced an associated reserved character.

9. The transaction card of claim 8 wherein said replacement character was determined to be not present in the original sequence of characters.

10. The transaction card of claim 9 wherein said replacement signal segment is combined with said replacement character to provide said reserved character.

11. The transaction card of claim 9 wherein said sequence of characters includes a plurality of different replacement characters, each replacement character being associated with a reserved character and identified by said replacement signal segment.

* * * * *